United States Patent Office 3,068,296
Patented Dec. 11, 1962

3,068,296
2-(SUBSTITUTED-BENZYL)-1,3-PROPANEDIOLS
Raymond G. Wilkinson, Montvale, N.J., and Thomas L. Fields, Pearl River, N.Y., assignors to American Cyanamid Company, New York, N. Y., a corporation of Maine
No Drawing. Original application July 15, 1958, Ser. No. 748,589. Divided and this application Apr. 25, 1961, Ser. No. 105,278
2 Claims. (Cl. 260—613)

This invention relates to new organic compounds and, more particularly, is concerned with novel substituted phenylethanes which may be represented by the following general formula:

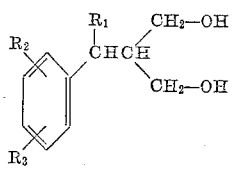

wherein $R_1$ is hydrogen, hydroxy, lower alkyl or a lower alkoxy radical, and $R_2$ and $R_3$ are hydrogen, halogen, hydroxy, lower alkyl, lower alkoxy or an aralkoxy radical. Suitable lower alkyl and lower alkoxy groups contemplated by the present invention are those having up to about 6 carbon atoms. Suitable aralkoxy groups are benzyloxy, phenthoxy, etc. Halogen is exemplified by bromine, chlorine and iodine.

The novel compounds of the present invention are useful intermediates for the preparation of 2-carboxymethyl and 2-formylmethyl-4-oxo-tetrahydronaphthalenes which form the subject matter of the copending application of Raymond G. Wilkinson and Andrew S. Kende, Serial No. 821,093, filed June 18, 1959. The new compounds of this invention are also useful in the synthesis of polyoxygenated cyclic compounds.

The new compounds of this invention may be prepared from the corresponding benzyl bromide according to the following reaction scheme:

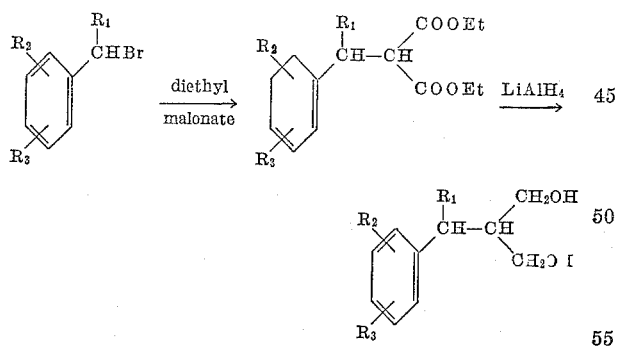

wherein $R_1$, $R_2$ and $R_3$ are as hereinbefore defined.

The reaction conditions are not especially critical. The reaction of the benzyl bromide with diethyl malonate salt is preferably carried out in a refluxing solution of a lower alkanol. The benzyl malonic ester so formed is reduced with lithium aluminum hydride in a conventional manner.

The invention will be described in greater detail in conjunction with the following specific examples.

Example 1

94.0 grams (0.6 mole) of 2-chloro-5-methoxy-toluene [Peratoner and Condorelli, Gazz. Chim. Ital., 28, I, 213 (1898)] are added to 600 milliliters of reagent grade carbon tetrachloride, 117.4 grams (0.66 mole) of N-bromosuccinimide and 0.1 gram benzoyl peroxide. The reaction mixture is stirred at reflux temperature and additional 0.1 gram quantities of benzoyl peroxide are added after 1½ and 18 hours. After 21 hours the volume of solvent is reduced to approximately 250 milliliters and the succinimide filtered off. The filtrate is washed with three 200 milliliter portions of water, dried over anhydrous $MgSO_4$ and filtered. The solvent is removed under reduced pressure and the residual oil crystallized on standing overnight. Yield of crude 2-chloro-5-methoxybenzyl bromide, 131.0 grams. The pure compound crystallizes from (20°–40°) petroleum ether as white needles, melting point 55.5°–57.5° C.

Example 2

131.0 grams (0.55 mole) of 2-chloro-5-methoxy-benzyl bromide in 300 milliliters of absolute ethanol is added over a 1 hour period to a refluxing solution of diethyl malonate (145 grams, 0.9 mole) and sodium methylate (32.4 grams, 0.6 mole) in absolute ethanol. The refluxing is continued for an additional 2½ hours and the reaction mixture concentrated to approximately half volume. The sodium bromide is filtered off and the filtrate acidified by the slow addition of acetic acid. The remainder of the solvent is removed under reduced pressure and the residual oil taken up in ether. The ethereal solution is washed with three 200 milliliter portions of water and dried over anhydrous $MgSO_4$. The ether and excess diethyl malonate are removed under water pump pressure. Diethyl 2-chloro-5-methoxybenzylmalonate is collected at 155°–168° C./0.4–0.8 mm.; yield: 90.0 grams; $n_D^{25}$ 1.5030. Overall yield based on 2-chloro-5-methoxy-toluene is 48%.

Example 3

A solution of 105 grams (0.33 mole) of diethyl 2-chloro-5-methoxybenzylmalonate in 360 milliliters of dry ether is added slowly with stirring to 19.5 grams (0.513 mole) of $LiAlH_4$ dissolved in 700 milliliters of dry ether. The mixture is stirred and refluxed for 4½ hours before decomposing the excess hydride with ethyl acetate. The mixture is acidified with 6 N HCl, washed with water, and allowed to stand over 70 milliliters of 5 N NaOH over the week-end. The ether layer is washed with $H_2O$, dried over $MgSO_4$ and concentrated to an almost colorless oil which turns to a mushy solid on seeding. Distillation at 0.1 mm. gives 64 grams (84%) of a colorless oil at 160°–175° C. with a small forerun at 130°–160° C. On seeding, the main fraction gives white crystals of 2-(2'-chloro-5'-methoxybenzyl)-1,3-propanediol, melting point 41°–46° C.

This application is a division of our copending application, Serial No. 748,589, filed July 15, 1958, and now Patent No. 3,013,069.

What is claimed is:
1. A compound of the formula:

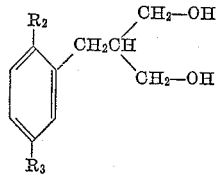

wherein $R_2$ is selected from the group consisting of chlorine, bromine and iodine, and $R_3$ is lower alkoxy.
2. 2-(2'-chloro-5'-methoxybenzyl)-1,3-propanediol.

References Cited in the file of this patent
UNITED STATES PATENTS
2,576,311  Schlesinger et al. _____ Nov. 27, 1951
3,013,069  Wilkinson et al. _____ Dec. 12, 1961
OTHER REFERENCES
Brewster: Organic Chemistry (1949), page 332.